United States Patent
Kim et al.

(10) Patent No.: US 9,478,249 B2
(45) Date of Patent: Oct. 25, 2016

(54) CACHE DATA MANAGEMENT FOR PROGRAM EXECUTION

(71) Applicant: Seagate Technology LLC, Cupertino, CA (US)

(72) Inventors: Jun Cheol Kim, Gyeonggi-do (KR); Hye Jeong Nam, Gyeonggi-do (KR); Jae Ik Song, Gyeonggi-do (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 41 days.

(21) Appl. No.: 14/014,912

(22) Filed: Aug. 30, 2013

(65) Prior Publication Data
US 2015/0062736 A1 Mar. 5, 2015

(51) Int. Cl.
*G11B 20/12* (2006.01)
*G11B 20/10* (2006.01)

(52) U.S. Cl.
CPC . *G11B 20/1252* (2013.01); *G11B 2020/10916* (2013.01); *G11B 2020/1295* (2013.01)

(58) Field of Classification Search
None
See application file for complete search history.

(56) References Cited

U.S. PATENT DOCUMENTS

| | | | | |
|---|---|---|---|---|
| 5,491,810 A | * | 2/1996 | Allen | G06F 3/0608 707/999.2 |
| 5,586,291 A | * | 12/1996 | Lasker et al. | 711/113 |
| 5,596,736 A | * | 1/1997 | Kerns | G06F 3/0601 711/100 |
| 6,360,341 B1 | * | 3/2002 | Yoshinaga | G01R 31/31813 714/718 |
| 6,452,868 B1 | * | 9/2002 | Fister | G11C 29/18 365/201 |
| 6,763,430 B1 | * | 7/2004 | Camp | 711/112 |
| 6,925,526 B2 | * | 8/2005 | Hall | G06F 3/0614 360/48 |
| 7,099,993 B2 | * | 8/2006 | Keeler | G06F 12/128 711/112 |
| 7,412,562 B2 | * | 8/2008 | Garney | 711/113 |
| 7,461,202 B2 | * | 12/2008 | Forrer, Jr. | G06F 12/0866 711/113 |
| 7,529,880 B2 | * | 5/2009 | Chung | G06F 12/0246 711/103 |
| 8,301,826 B2 | * | 10/2012 | Gonzalez | G06F 12/0246 365/230.01 |
| 2003/0126201 A1 | | 7/2003 | Hoang | |
| 2012/0151134 A1 | * | 6/2012 | Friendshuh et al. | 711/113 |

* cited by examiner

*Primary Examiner* — K. Wong
(74) *Attorney, Agent, or Firm* — HolzerIPLaw, PC

(57) ABSTRACT

Implementations disclosed herein provide for sequential readback of program data in from a cached data region of a storage device. In particular, the disclosed technology provides for storing a sequence of logical addresses associated with execution of a program, the sequence of logical addresses including at least two consecutive logical addresses associated with non-consecutive data blocks in a user data region; writing data corresponding to the at least two consecutive logical addresses to sequential data blocks in a cached data region; determining that a sequence of read commands from a host computer is associated with the data; and reading the data from the cached data region.

20 Claims, 4 Drawing Sheets

CACHE DATA MANAGEMENT FOR PROGRAM EXECUTION

BACKGROUND

When a computer executes a program, a storage device may be requested to read a variety of different data files located at non-sequential positions on a storage media. To read these files in an order specified by the program, an actuator arm of the storage device may have to move around between the different radial positions. Excessive actuator arm movement is time consuming and a nontrivial power consumer.

SUMMARY

Implementations described and claimed herein provide for storing a sequence of logical addresses associated with execution of a program, the sequence of logical addresses including at least two consecutive read commands associated with non-consecutive data blocks in a user data region of a storage device; writing data corresponding to the sequence of logical addresses to sequential data blocks in a cached data region; determining that a sequence of read commands from a host computer is associated with the data; and reading the data in the cached data region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
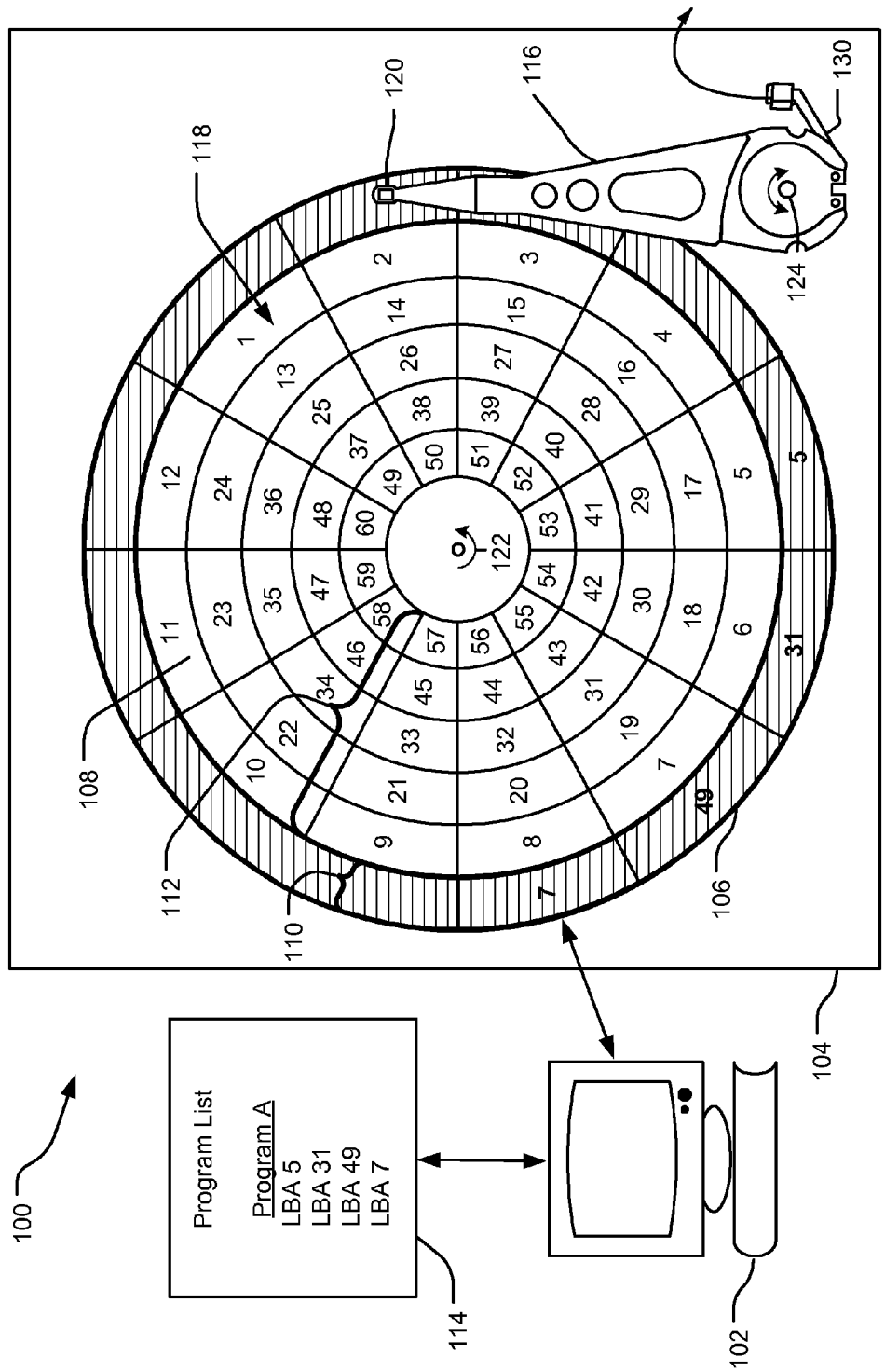
FIG. 1 illustrates a data storage system for program execution with sequential reading of program data.

FIG. 1 illustrates a data storage system 100 for program execution with sequential reading of program data. The data storage system 100 includes a host computer 102 that sends one of more access commands (e.g., read or write commands) to a storage device 104. The storage device 104 is a disk drive assembly; however, in other implementations, the storage device 104 may be any device having any tangible computer-readable storage media that can store data in sequential units, such as cells or blocks, that are accessible by a computer. Such tangible computer-readable media may include without limitation magnetic storage disks, solid-state drives, flash memory, optical storage disks, random access memories (RAMs), read only memories (ROMs), and the like. The storage device 104 includes a disk 106 that has a number of data blocks (e.g., a sector 108), which can hold a set number of storage bytes.

The storage device 104 includes a head 120 on a distal end of an actuator arm 116 positioned over the disk 106. A rotary voice coil motor that rotates about an actuator axis of rotation 124 is used to position the head 120 on a concentric data track (e.g., a concentric data track 118 including the sector 108) and a spindle motor that rotates about disk axis of rotation 122 is used to rotate the disk 106. A flex cable 130 provides the requisite electrical connection paths for the slider 120 while allowing pivotal movement of the actuator arm 116 during operation.

Storage space on the disk 106 is divided between a cached data area (CDA) 110 that is the outermost data track on the disk 106 and a user data area (UDA) 112 that includes all other data tracks on the disk 106. The UDA 112 is the primary data storage area that is read from and written to by the host computer 102. Each data block in the UDA 112 is associated with a logical address (e.g., a logical block address (LBA)), which may be specified in a read or write command transmitted to the storage device 104 by the host computer 102. The CDA 110 is used primarily for temporary and/or redundant data storage and may allow for a sequential read of select data stored therein.

When executing a program, a host computer 102 issues a sequence of commands instructing the storage device 104 to read data stored in a number of different data blocks within the UDA 112. This type of data read during execution of a program is referred to herein as "program data." Program data may include data files, for example, various libraries, logfiles, etc., as well as executable files that are called during the execution of a program.

A command sequence for an example program A (illustrated in a program list 114), includes sequential read commands to logical block addresses (LBAs) 5, 31, 49, and 7 corresponding to different data blocks at various locations on the storage medium 106. When the storage device 104 receives consecutive read commands relating to first and second data blocks on different data tracks (e.g., LBA 2 and LBA 29), the storage device 104 performs a "seek" of the actuator arm 109 in order to move the head 120 from a first radial position corresponding to the first data block (e.g., LBA 2) and to a second radial position corresponding to the second data block (e.g., LBA 29). This type of read operation scheme requiring a seek operation is referred to herein as a "random read."

Every seek operation takes a period of time (i.e., a "seek latency time"). Seek latency time can be a significant factor in program execution speed. During execution of some programs, seek latency time is so significant that it equals or exceeds the amount of time that the storage device 104 spends actually reading data from the disk 106. However, program execution speed can be increased dramatically when some or all program data is read sequentially rather than randomly during program execution.

An example of a "sequential read" is a read operation scheme of at least two data blocks that does not require execution of a seek operation. In a hard drive disk assembly, a read of consecutive sectors along a data track is a sequential read. For example, a read of LBAs 5 and 6 is a sequential read. Likewise, a read of more than two consecutive sectors along a single data track is a sequential read.

The CDA 110 of the storage device 104 is a cache area where program data of frequently-accessed programs can be stored to allow for sequential reading of such data during program execution. For example, program data of Program A, stored in LBA's 5, 31, 49, and 7 of the UDA 112, can be written to consecutive sectors in the CDA 110 (as illustrated). Storing the program data in the CDA 110 in the illustrated manner allows for a sequential read of such data, expediting the execution of the Program A by eliminating the need for multiple, time-consuming seek operations.

Figure 2:
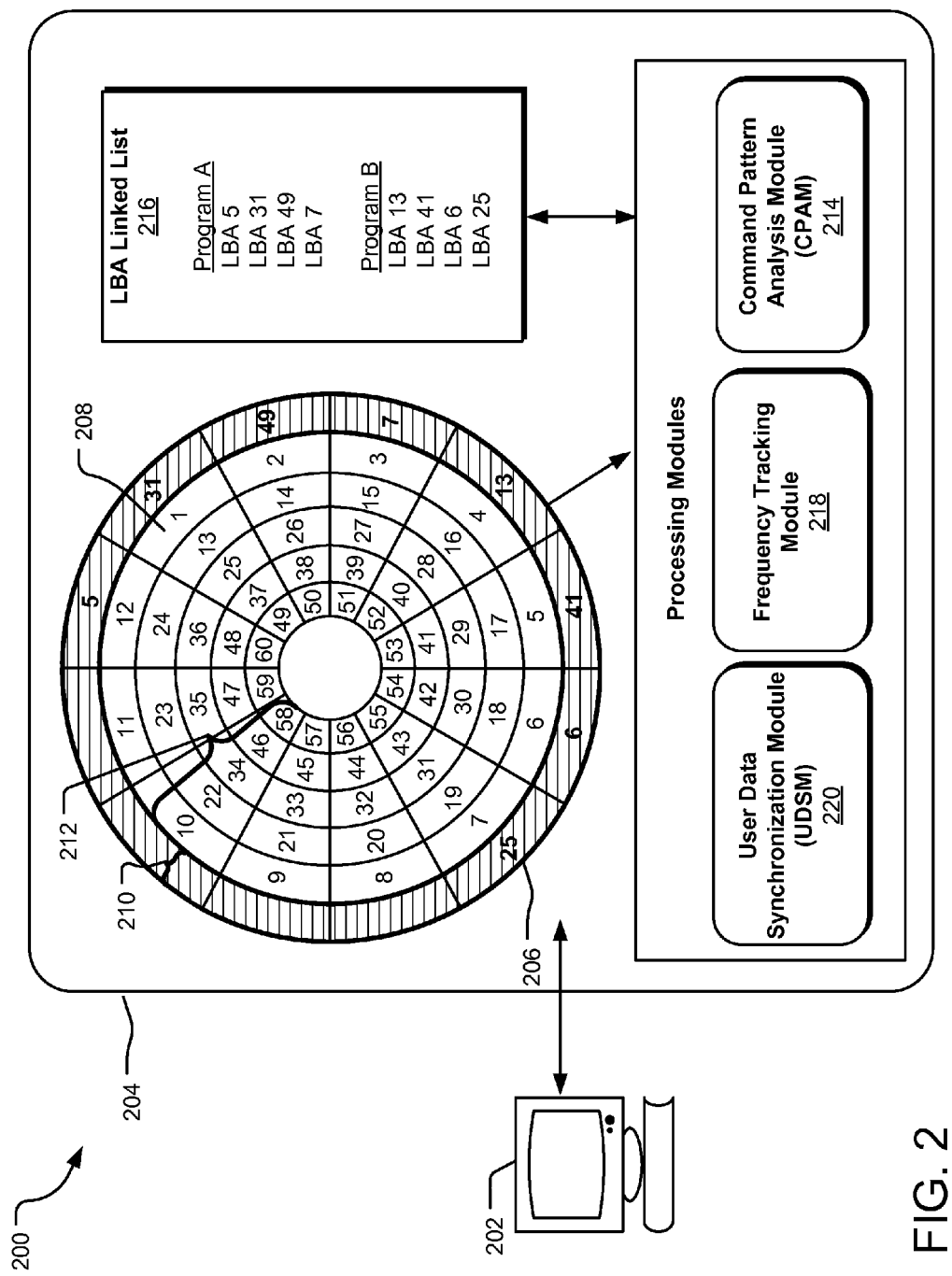
FIG. 2 illustrates a data storage system for program execution with sequential reading of program data.

FIG. 2 illustrates a data storage system 200 for program execution with sequential reading of program data. The data storage system 200 includes a host computer 202 communicatively coupled to a storage device 204. The storage device 204 includes a disk 206 with a number of data blocks (e.g., a sector "208") configured to stored data in individual data cells. Storage space on the disk 206 is divided between a cached data area (CDA) 210 and a user data area (UDA) 212. The UDA 212 is the primary data storage area that is read from and written to by the host computer 202. The CDA 210 is used primarily for temporary and/or redundant data storage and allows for a sequential read of selected data, such as program data, stored therein.

The storage device 204 includes a number of processing modules such as a User Data Synchronization Module 220, a Frequency Tracking Module 218, and a Command Pattern Analysis Module (CPAM) 214. Each of the processing modules may be, for example, a functional module of firmware of the storage device 204 that is executed on a processor of a host computer. In alternate embodiments, it is possible that the storage device 204 includes integrated processor(s); in such cases the processing modules may, for example, be firmware and a processor within the storage device 204.

The frequency tracking module 218 identifies one or more programs that are "frequently executed." Program data associated with each of the programs identified as frequently-executed is stored in a selected order in the CDA 210. In one implementation, a frequently-executed program is a program having a calculated usage metric that exceeds an established static or dynamic threshold. The usage metric of a program may depend, among other factors, upon a frequency and/or recency of program execution. For example, the frequency tracking module 218 may categorize Programs A and B as frequently-executed programs if they are each executed five or more times in one week. Other thresholds may be employed, such as relative frequency of a program's execution compared to other programs, or any other threshold scheme without limitation.

In at least one implementation, the frequency tracking module 218 does not determine which programs are frequently executed; rather, frequently-executed programs are preselected by a user and/or set by a default setting of the storage device. In yet other embodiments, the storage device may have a default setting of frequently-executed programs that may be updated by user input of by frequency thresholds as described above. In this manner, a storage device may have increased performance at first use due to the default settings, and performance can be further improved via user interaction and/or frequency metrics generated by the frequency tracking module 218.

The frequency tracking module 218 works in conjunction with the CPAM 214 to determine when each program is executed. The CPAM 214 may identify a currently-executing program as a frequently executed program by comparing one or more patterns in a received read command sequence to patterns appearing in one or more data records. An example of a "data record" is a record such as a table, logfile, etc., that may be saved on the storage device 204 or a storage medium communicatively coupled to the storage device 204. The frequency tracking module 218 may record and manage statistics on the execution of each program. These statistics can be used to determine which programs are "frequently-executed."

Programs data associated with each program identified as frequently-executed program is stored in the UDA 212 and also in the CDA 210. Therefore, when one of the frequently-executed programs is executed, associated program data can be read from either of the two storage locations. If the program data is read from the UDA 212, the read is a random read. However, if the program data is read from the CDA 210, the read is sequential and along a single data track. For example, program data of Program A can be read by moving a head of the actuator sequentially between LBAs 5, 31, 49, and 7 of the UDA 212. Alternatively, the program data of Program A can be read sequentially from consecutive data blocks along the CDA 210, which sequentially store the data associated with LBAs 5, 31, 49, and 7. Reading such program data from the CDA 210 instead of the UDA 212 expedites program execution by eliminating the need for multiple, time-consuming seek operations.

When a sequence of read commands is received from the host computer 202, the CPAM 214 determines whether to read the data from the UDA 212 or the CDA 210. To make this determination, the CPAM 214 analyzes the sequence of read commands and compares the sequence of read commands with information in an LBA linked list 216. The LBA linked list 216 is an example data record that includes LBA sequences read during the execution of each of the frequently-executed programs (e.g., Programs A and B). In one implementation, the CPAM 214 compares LBAs appearing in the read command sequence to LBAs included in the LBA linked list 216.

If the CPAM 214 identifies a pattern in the sequence of read commands that substantially matches a pattern in the LBA linked list 216, the storage device 204 can take action to read the requested program data from the CDA 210. For example, the CPAM 214 or another module may access one other more data records (e.g., an LBA mapping table) to determine where in the CDA 210 the requested program data is stored.

If the CPAM 214 fails to identify a pattern in the sequence of read commands that matches a pattern in the LBA linked list 216, the storage device 204 can take action to read the requested program data from the UDA 212.

In another implementation, the LBA linked list 216 includes LBA sequences or other identifiers associated with the execution of all or several programs (including those that are not frequently-executed programs). The CPAM 214 uses additional information stored in the LBA linked list 216 to determine whether the sequence of read commands is associated with program data in the CDA 210.

To ensure efficient use of storage space in the CDA 210, a tracking module, such as the frequency tracking module 218, tracks how often each of the frequently-executed programs is actually executed. A usage metric can be calculated for each program based on how frequently, recently, and/or regularly such programs are executed. If the usage metric for a frequently-executed program drops below a predetermined usage threshold, associated program data may be deleted from the CDA 210 to make room for other data, such as data that is accessed more frequently, regularly, etc. When program data is deleted from the CDA 210, the LBA linked list 216 may also be modified to remove or modify information relating to the former, frequently-executed program. In some embodiments, this predetermined usage threshold may be static; however, in other embodiments this threshold may vary based upon the amount of space available in the CDA 210. Thus, as storage space in the CDA 210 becomes more scarce, the usage threshold may increase to ensure that only very frequently executed programs are stored in the CDA 210. Conversely, if there is substantial room within the CDA 210, the threshold may be much lower, thereby still providing enhanced performance for even semi-frequently executed programs.

In one implementation, the frequency tracking module 218 updates a data record, or increments a counter, each time program data is read from the CDA 210. For example, the CPAM 214 may receive a read command sequence including the LBAs 5, 31, and 49. The CPAM 214 accesses the LBA linked list 216, identifies the LBA sequence "5, 31, and 49" on the LBA linked list 216, and determines that the read command sequence is associated with the execution of Program A. In response, data of LBAs 5, 31, and 49 is read from the CDA 210 and the frequency tracking module 218 records, in a data record, that Program A has been executed. The frequency tracking module 218 can use the recorded information to subsequently evaluate which data in the CDA 210 can be removed (e.g., because it is not frequently accessed).

When program data associated with a frequently-executed program is modified within the UDA 212, associated data within the CDA 210 can be modified similarly to avoid discrepancies between duplicate data sets. This type of "synchronization update" may immediately precede the execution of a write command on the UDA 212 or occur at a later time, such as when the storage device 204 is idle. For example, the host computer 204 may issue a write command to modify program data in LBA 5. Responsive to the write command, the storage device 204 modifies LBA 5 in the UDA 212 and accesses the LBA linked list 216 to determine whether LBA 5 is associated with a frequently-executed program. Because LBA 5 is associated with the execution of Program A and associated program data is stored in the CDA 210, the storage device 204 also modifies the data corresponding to LBA 5 in the CDA 210 to match the modification of the data in LBA 5 of the UDA 212.

The CDA 210 can be located anywhere on the disk 106. However, it may be advantageous to locate the CDA 210 near the outer diameter of the disk 206 (as shown) because data near the outer diameter of a magnetic disk can be read with a faster linear speed than data near the inner diameter. In one implementation, the CDA 210 includes multiple adjacent data tracks. In another implementation, the CDA 210 includes multiple non-adjacent tracks. In either of these implementations, program data for each one of the frequently-executed programs may be confined to one of the multiple data tracks or it may be distributed between two or more of the data tracks. For example, program data for Program A may be sequentially read from a single data track of the CDA 210; alternatively, program data for Program A may be read during two or more separate sequential read operations of different data tracks of the CDA 210. Other implementations are also contemplated that reduce seek latency time during program execution.

Figure 3:
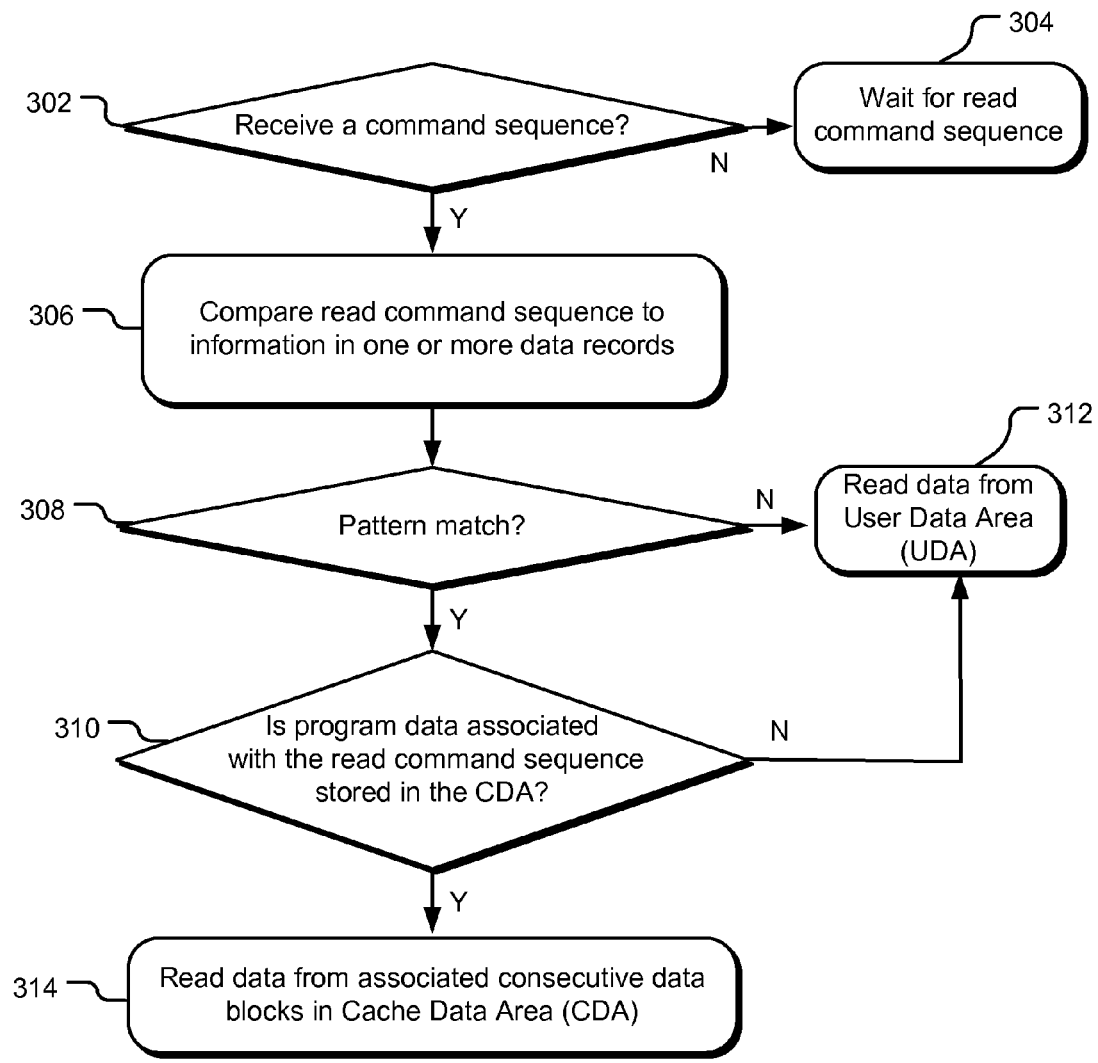
FIG. 3 illustrates a flowchart of example operations for sequentially reading program data stored in a cached data area (CDA) of a storage device.

FIG. 3 illustrates a flowchart of example operations for sequentially reading program data stored in a storage device. The storage device has both a user data area (UDA) for random reads of program data and a cached data area (CDA) for sequential reads of select program data. A first determination operation 302 determines whether a read command sequence has been received from a host device. If a read command sequence has not been received, a waiting operation 304 commences until the next read command sequence is received.

If the first determination operation 302 determines that a read command sequence has been received, a comparing operation 306 searches a data record and compares information in the data record to the received read command sequence. The comparing operation 306 may search for a pattern (e.g., an LBA pattern) that appears in both the read command sequence and the data record of the storage device. In one implementation, the data record is a record including LBA sequences read during execution of each of a number of frequently-executed programs. The comparing operation 306 compares the read command sequences with the LBA sequences in the data record.

In another implementation, the data record is a table including information associated with both programs frequently-executed programs and non-frequently executed programs. The table includes an identifier associated with each program. The identifier appears in a sequence of read commands associated with the execution of the associated program. The comparing operation 306 compares the read command sequence with each of the identifiers.

A pattern match determination operation 308 determines whether the data record and the sequence of read commands satisfy a predetermined relationship (e.g., whether both include an identical pattern). If the predetermined relationship cannot be identified, a read operation 312 executes the sequence of read commands on the UDA of the storage device.

If, however, the pattern match determination operation 308 determines that the data record and the sequence of read commands satisfy the predetermined relationship, a data location operation 310 determines whether program data of the currently-executing program is stored in the CDA. In one implementation, the data location operation 310 determines that the program data is stored in the CDA automatically (e.g., if a positive match has been identified). This may be the case if the data record searched by the comparing operation 306 is a data record including information associated with only programs that have associated data stored in the CDA.

In another implementation, the data location operation 310 determines that program data is stored in the CDA if the data record searched by the comparing operation 306 includes a field indicating that the program data is stored in the CDA. For example, the data record searched may be a table including each of a number of programs, an identifier to be compared with the incoming sequence of read commands, and a field indicating whether associated program data is stored in the CDA.

If the data location operation 310 determines that the program data of the currently-executing program is stored in the CDA, then a read operation 314 reads the program data from data blocks of the CDA. If, however, the data location operation 310 determines that the program data of the currently-executing program is not stored in the CDA, then the read operation 312 executes the sequence of read commands on data blocks of the UDA.

Figure 4:
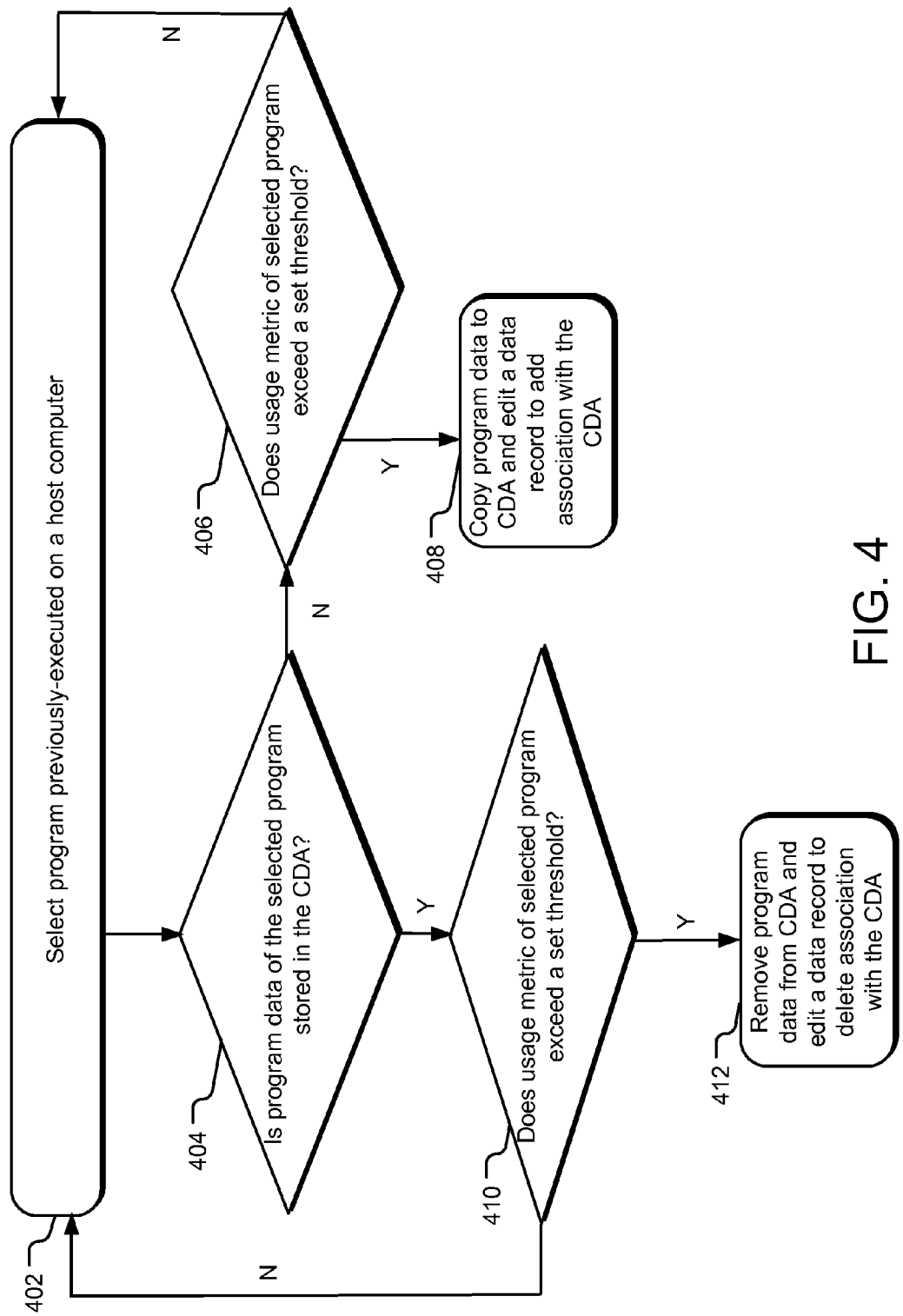
FIG. 4 illustrates a flowchart of example operations for managing program data in a data storage system.

FIG. 4 illustrates a flowchart of example operations for managing program data in a data storage system. The data storage system has both a user data area (UDA) for random reads of program data and a cached data area (CDA) for sequential reads of select program data. A program selection operation 402 selects a program previously-executed on a host computer, such as from a list of programs included in a data file of the storage device.

A data location operation 404 determines, such as by accessing another data file, whether program data of the selected program is stored in a cached data area (CDA). If associated program data is not stored in the CDA, the subsequent operations performed may include modifying the CDA to include such program data. A frequency determination operation 406 determines whether the selected program has a usage metric exceeding a set threshold. The usage metric may be calculated based on a number of factors including without limitation the frequency and/or recency of program execution. Information used to calculate the usage metric may be tracked and managed by one or more modules of the data management system.

If the frequency determination operation 406 determines that the usage metric of the selected program does not exceed a set threshold, the program selection operation 402 selects another program previously-executed on the computer. However, if the frequency determination operation 406 determines that the usage metric of the selected program does exceed the set threshold, a writing operation 408 writes the associated program data to the CDA and updates one or more data records to indicate that data of the selected program (e.g., a Program A) is now stored in the CDA.

If the data location operation 404 determines that program data of the selected program is stored in the CDA, the subsequent operations performed may include removing such data from the CDA. Another frequency determination operation 410 determines whether the selected program has a usage metric exceeding a predetermined static or dynamic threshold. If the frequency determination operation 410 determines that the usage metric of the selected program exceeds the set threshold, the program selection operation 402 selects another program. If, however, the frequency determination operation 410 determines that the usage metric of the selected program does not exceed the set threshold, a removal operation 412 removes the associated program data from the CDA and updates information in one or more data records to indicate that data associated with the selected program is no longer stored in the CDA.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   storing a sequence of logical addresses associated with execution of a program, the sequence of logical addresses including at least two consecutive logical addresses associated with non-consecutive data blocks in a user data region of a storage media;
   writing data corresponding to the at least two consecutive logical addresses to sequential data blocks in a cached data region;
   comparing logical addresses associated with a sequence of read commands from a host computer to the stored sequence of logical addresses;
   determining that the sequence of read commands from the host computer is associated with the data; and
   reading the data sequentially from the cached data region.

2. The method of claim 1, wherein the stored sequence of logical addresses is stored in a data record that includes information associated with a plurality of programs, each program having a usage metric that exceeds a predetermined threshold.

3. The method of claim 2, wherein the usage metric is based on at least one of frequency of program execution and recency of program execution.

4. The method of claim 1, wherein the at least two consecutive logical addresses are associated with data blocks positioned along different data tracks in the user data region.

5. The method of claim 1, wherein the cached data region includes a data track proximal to an outer perimeter of a magnetic disk.

6. The method of claim 1, further comprising:
   responsive to a write command, overwriting old data in the user data region with new data;
   determining that the old data is included in the cached data region; and
   overwriting the old data in the cached data region with the new data.

7. The method of claim 6, wherein overwriting the old data in the cached data region further comprises:
   overwriting the old data in the cached data region with the new data when a storage device is idle.

8. The method of claim 1, further comprising:
   removing the data from the cached data region when a frequency of execution of the program drops below a threshold frequency.

9. The method of claim 1, wherein the consecutive data blocks are consecutive sectors along a data track of a hard drive disk.

10. A method comprising:
    storing a sequence of logical addresses associated with execution of a program, the sequence of logical addresses including at least two consecutive logical addresses associated with non-consecutive data blocks in a user data region;
    determining, using a processor, that the sequence of logical addresses is accessed with a frequency that exceeds a threshold frequency; and
    based on the determination operation, copying data associated with the non-consecutive data blocks to consecutive data blocks in a cached data region to allow for a sequential read of the data when the program is executed.

11. The method of claim 10, further comprising:
    determining that a plurality of read commands are associated with the data in the cached data region; and
    reading the data from the cached data region.

12. The method of claim 10, wherein the cached data region includes a data track proximal to an outer perimeter of a magnetic disk of a storage device.

13. The method of claim 10, wherein the consecutive data blocks are consecutive sectors along a data track of a hard drive disk.

14. The method of claim 10, wherein the cached data region stores program data associated with frequently-executed programs.

15. A storage device configured to:
   store a sequence of logical addresses associated with execution of a program, the sequence of logical addresses including at least two consecutive logical addresses associated with non-consecutive data blocks in a user data region of a storage device;
   determine that requested data is stored in a cached data region by comparing a sequence of logical addresses associated with a sequence of read commands to the stored sequence of logical addresses; and
   read the requested data sequentially from the cached data region.

16. The storage device of claim 15, wherein the requested data is stored sequentially in the cached data region.

17. The storage device of claim 16, wherein the at least two consecutive logical addresses in the sequence of logical addresses are associated with data blocks positioned along different data tracks in a user data region.

18. The storage device of claim 15, wherein the cached data region includes a data track proximal to an outer perimeter of a magnetic disk.

19. The storage device of claim 15, wherein the storage device is further configured to:
   track an execution frequency of the program and remove the data from the cached data region if the execution frequency is below a threshold frequency.

20. The storage device of claim 16, wherein the cached data region is the outermost data track on a disk.

* * * * *